Aug. 12, 1958 E. C. McRAE 2,847,029
CONTROL VALVE FOR TRACTOR HYDRAULIC SYSTEMS
Filed Dec. 28, 1953 2 Sheets-Sheet 1
FIG. I
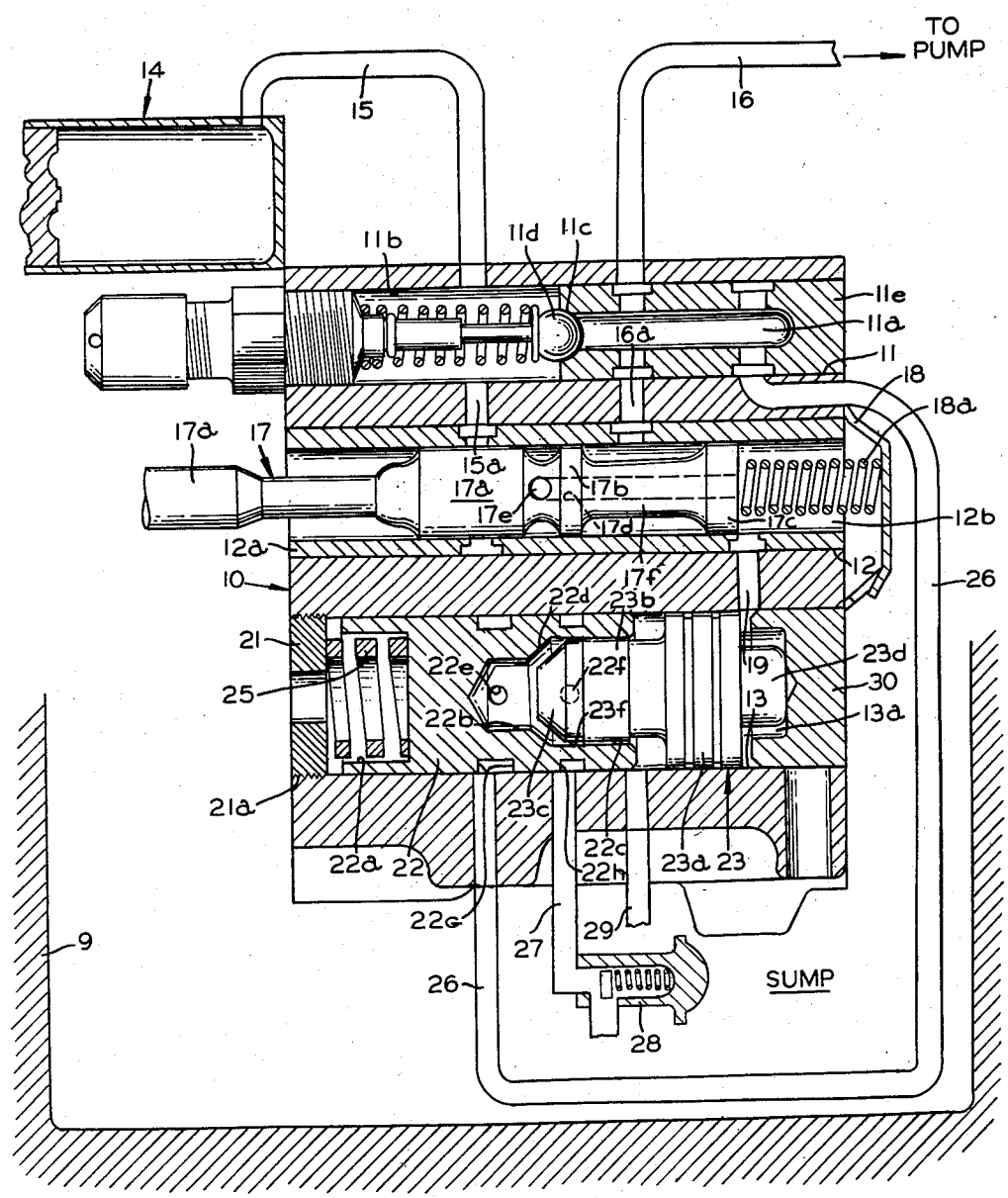
INVENTOR.
E.C. MC RAE
BY J. R. Faulkner
W. J. Schaich
ATTORNEYS

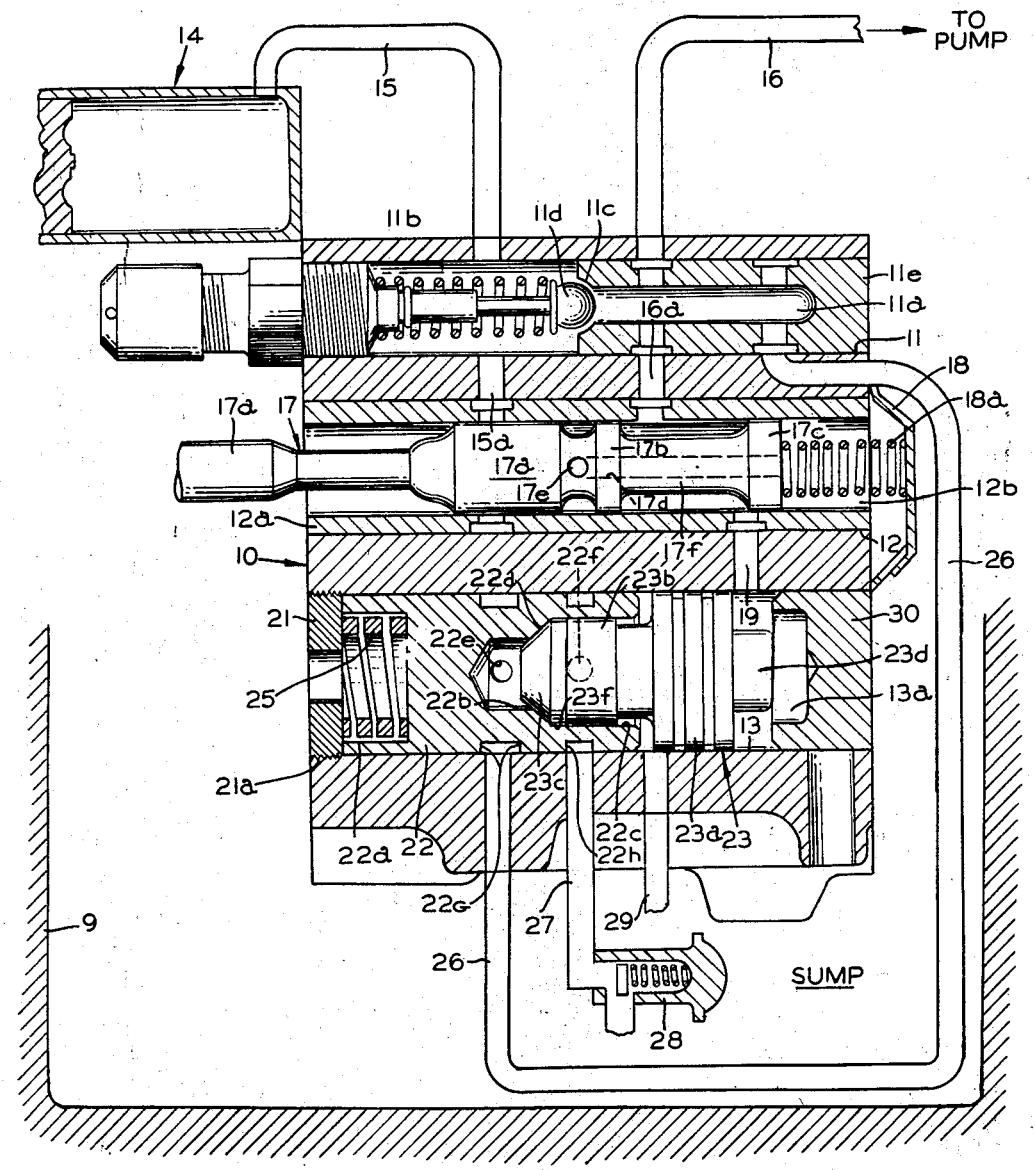

United States Patent Office 2,847,029
Patented Aug. 12, 1958

2,847,029

CONTROL VALVE FOR TRACTOR HYDRAULIC SYSTEMS

Edwin C. McRae, Dearborn, Mich., assignor to Ford Motor Company, Dearborn, Mich., a corporation of Delaware Application December 28, 1953, Serial No. 400,494

4 Claims. (Cl. 137—621)

This invention relates to an improved hydraulic system for tractors, and particularly to an improved control valve for tractor hydraulic systems of the type utilizing a constantly operating pump as a source of fluid pressure.

In recent years, a majority of the commercially available agricultural type tractors have employed hydraulic systems for controlling the operation of one or more hydraulic rams on the tractor of the type wherein a constantly operating pump is employed and a shuttle type control valve is utilized to control the discharge of pressured fluid into the sump in accordance with the requirements of the system for pressured fluid. In other words, when it is required that pressured fluid be supplied to one of the tractor rams, the shuttle valve would be actuated to its closed position, interrupting the flow of fluid to the sump, and hence permitting the fluid pressure in the system to build up to the value required to effect the desired displacement of the ram. When no pressured fluid is required, the entire output of the pump is by-passed through the shuttle valve into the sump.

One of the outstanding characteristics of this type of hydraulic system lies in its speed of response to a control signal. In fact, the speed of response has been sufficiently fast that the resulting acceleration of an implement connected to the tractor ram is rapid enough to produce a sharp reaction force on the tractor, which may be the source of some discomfort to the tractor operator.

Accordingly, it is an object of this invention to provide an improved valve system for a tractor hydraulic system of the type utilizing a constantly operating pump.

A further object of this invention is to provide an improved shuttle type control valve for controlling the discharge of pressurized fluid to the sump of a tractor hydraulic system, characterized by the provision of means for automatically delaying the positioning of such control valve in its fully closed position so as to substantially reduce the rate of pressure buildup in the system when the control valve is shifted toward its closed position.

The specific nature of this invention, as well as other objects and advantages thereof, will become apparent to those skilled in the art from the following detailed description taken in conjunction with the attached drawings on which, by way of preferred example only, is illustrated one embodiment of this invention:

Figure 1 is a schematic sectional view of a tractor hydraulic system incorporating a control valve embodying this invention, the elements of the system being shown in their neutral position.

Figure 2 is a view similar to Figure 1 but showing the elements in their positions corresponding to a demand for pressured fluid.

As shown on the drawings:

The numeral 10 schematically represents a valve housing having a plurality of valve bores 11, 12 and 13 which respectively house various valve elements of the hydraulic system. Numeral 14 represents a hydraulic ram of the single acting type commonly found on agricultural tractors, and the supply of fluid to ram 14 is effected through a conduit 15. A second conduit 16 is provided which is conventionally connected to the discharge side of a constantly operating pump (not shown). As is conventional in tractor hydraulic systems, the casing 10 is preferably disposed in overlying relationship to an enclosed chamber 9 which functions as a sump for the hydraulic system and a suitable conduit connects the sump to the inlet side of the pump (not shown). Accordingly, any fluid ports leading to the exterior of valve casing 10 constitute connections to the sump chamber 9.

The valve bore 11 has a plug 11e inserted in one end which is bored to define a small diameter chamber 11a, one end of which communicates with a larger diameter check valve chamber 11b formed by the other end of bore 11. A valve seat 11c is formed at the juncture of chamber portions 11a and 11b and a spring biased check valve 11d is conventionally mounted in valve chamber 11b to cooperate with the seat 11c. The ram supply conduit 15 connects with check valve chamber 11b while the pump conduit 16 is in fluid communication with the chamber 11a. Thus, when the fluid pressure is permitted to increase in chamber 11a sufficiently to overcome the spring bias of check valve 11d, pressured fluid will then be supplied to the tractor ram 14.

The second valve bore 12 has a valve sleeve 12a mounted therein and a primary control valve 17 is slidably mounted in sleeve 12a. The one end 17a of valve 17 projects out of one end of sleeve 12a and is adapted for connection to the conventional control linkage (not shown) of the tractor so that the axial position of valve 17 may be controlled either manually, or automatically in response to implement draft, implement height or some other characteristic, in conventional fashion. A spring seat 18 is mounted on the casing 10 in overlying, but non-closing relationship to the other end 12b of valve sleeve 12a. A spring 18a is then mounted between spring seat 18 and the inserted end of valve 17 to provide a continuous bias on valve 17 to take up any back lash in its control linkage and to insure the return of the valve 17 to its neutral position, shown in Figure 1.

Valve 17 is provided with three axially spaced piston portions 17a, 17b and 17c respectively. Additionally, an axial bore 17d is formed in the inserted end of valve 17 and communicates with a radial bore 17e disposed intermediate the piston portions 17a and 17b.

Three fluid conduits are provided to communicate with the interior of valve sleeve 12a. First, there is a conduit 15a which, in effect, constitutes an extension of the ram conduit 15. In the neutral position of valve 17, conduit 15 passes through sleeve 12a in the vicinity of the medial portion of the piston portion 17a. The second conduit 16a in effect constitutes an extension of the pump supply conduit 16 and communicates with the interior of valve sleeve 12a at a point which is substantially midway between the piston portions 17b and 17c when the valve 17 is in its neutral position. Lastly, a control conduit 19 is provided which connects the interior of valve sleeve 12a with the third valve bore 13. In the neutral position of valve 17, the piston portion 17c lies just to the left of the end of conduit 19.

Thus far, the elements described are entirely conventional. The valve bore 13 is utilized to mount a shuttle type control valve assembly embodying this invention. A plug 30 is inserted in the right hand end of valve bore 13 and defines a small diameter chamber 13a. The left hand end of valve bore 13 has an annular spring seat 21 suitably mounted therein, as by threads 21a. The valve assembly comprises a seat member 22 and a cooperating piston member 23. The seat member 22 is of cylindrical configuration and is axially slidable within valve bore 13 to a limited extent. At its left hand end, as viewed in the drawings, the valve seat member 22 is provided with an enlarged bore 22a within which is mounted a relatively stiff compression spring 25. The right hand end of valve seat 22 is provided with a bore 22b which is in turn counterbored as indicated at 22c to form an annular conical valve seat 22d. Lastly, the valve seat 22 is provided with a plurality of radial bores 22e and 22f which respectively communicate between bores 22b and 22c and annular grooves 22g and 22h formed in the periphery of valve seat 22.

The piston 23 includes a central piston portion 23a which slidably cooperates with the walls of valve bore 13 and a reduced diameter cylindrical end portion 23b having a conical surface 23c formed at its free end to cooperate in fluid sealing relationship with the conical valve seat 22d. Additionally, the other end of piston 23 is provided with a reduced diameter cylindrical projection 23d which fits in the chamber 13a and limits movement of piston 23 to the right, as viewed in the drawings.

Four fluid conduits are provided in communication with valve bore 13. First, there is the control conduit 19, which has already been described, which communicates with the right hand end of valve bore 13. In this connection, it should be noted that the length of the piston projection 23d is proportioned so that the piston portion 23a cannot effect the complete closure of control conduit 19 even when piston 23 is in its extreme right hand position. Secondly, an inlet conduit 26 is provided which communicates with the annular groove 22g and at its other end communicates with the chamber 11a of the check valve bore 11. Thirdly, a return conduit 27 is provided communicating with the annular groove 22h and at its other end connects to a pressure reducing valve indicated schematically at 28. Pressure reducing valve 28 is of any desired conventional construction and operates to maintain a predetermined low pressure, of greater value than the fluid pressure in the sump 9, within the return conduit 27. Lastly, a conduit 29 is provided which communicates with the valve bore 13 at a point just to the left of the piston portion 23a. Conduit 29 is of suitable axial width so that it will remain open even when piston 23 is displaced to its extreme left hand position. The other end of conduit 29 communicates with the sump chamber 9.

In the operation of the aforedescribed hydraulic system, when the control valve 17 is positioned as indicated in Figure 1, the system is in neutral and no fluid will be either supplied to or withdrawn from the tractor ram 14. In this position, the hydraulic fluid pressured by the pump flows through conduit 16 and thence through valve chamber 11a into inlet conduit 26; from inlet conduit 26 it flows into the bore 22b and thence through counterbore 22c and return conduit 27 to the low pressure regulating valve 28 and thence to the sump 9. The low pressure created in the aforedescribed circuit by pressure regulating valve 28 is sufficient to act upon the left hand end of piston 23 and maintain piston 23 in its extreme right hand or open position. In this connection, it should be noted that the right hand end of piston 23 is exposed only to sump pressure by virtue of the connection thereto provided by control conduit 19 and the open end 12b of valve bore 12. The low pressure developed in the system is insufficient to overcome the spring bias on check valve 11d and hence no fluid is supplied to or withdrawn from the tractor ram 14.

Upon shifting of the primary control valve 17 to the left, the elements of the system will be positioned as to permit fluid to drain from the tractor ram 14 through the conduits 15, 15a, radial port 17e, axial port 17d and thence through the open end 12b of the valve bore 12 to the sump.

When the control valve 17 is shifted to the right to occupy the position shown in Figure 2, fluid pressure is then supplied to the right hand end of piston 23 through conduits 16, 16a, and 19, the fluid flowing freely around the reduced diameter portion 17f of valve 17 lying intermediate piston portions 17b and 17c. Due to the greater effective area of the right hand end of piston 23, such piston will be shifted to the left; hence, will tend to cut off fluid flow through the pressure regulating valve 28 by the engagement of the conical portion 23c of the piston 23 with a seat 22d of valve seat member 22. However, just as soon as the flow of fluid through conduits 26 and 27 is restricted, the pressure in inlet conduit 26 and hence in bore 22b will tend to increase sharply and will, in turn, produce a displacement of the entire valve seat member 22 to the left against the bias of spring 25. It is therefore important, that the spring force exerted by spring 25 be proportioned so that its initial bias is substantially less than the effective force on the valve seat member 22 generated by the maximum pressure which the system is capable of producing, thus assuring the gradual displacement of valve seat member as the pressure gradually builds up. Of course a relief valve, not shown, is incorporated in the system to limit such maximum pressure. Accordingly, the full cut off of fluid flow between ports 26 and 27 will be delayed until valve seat member 22 is moved to a position where the bias of spring 25 equals the pressure exerted upon the piston 23.

The delay characteristics of the aforedescribed valve are further improved by the provision of an annular under cut 23f on the piston portion 23b immediately adjacent the conical seat portion 23c. Such undercut has been found to reduce the sharpness of the seating movements of piston 23 against seat 22.

It necessarily follows that the rate of pressure build-up in the entire system, and particularly in the chamber 11a and the ram supply conduit 15 will be substantially reduced. As a result, the initial acceleration of the ram 14 will be reduced to such a degree that the reaction effects on the tractor, even when a heavy implement is carried by ram 14, will be negligible and will produce no discomfort for the tractor operator.

It will, of course, be understood that various details of construction may be varied through a wide range without departing from the principles of this invention and it is, therefor, not the purpose to limit the patent granted hereon otherwise than necessitated by the scope of the appended claims.

I claim:

1. In a hydraulic control system, a valve housing having an inlet port and a return port, and a fluid connection from said inlet port to said return port, a fluid pressure responsive shiftable valve seat in said fluid connection, a fluid pressure responsive shuttle valve shiftable in alignment with said valve seat and normally held out of engagement with said valve seat by the pressure in said fluid connection, control means movable to a position admitting fluid from said inlet port to said shuttle valve to move said shuttle valve into engagement with said valve seat to close said fluid connection and interrupt the flow of fluid from said inlet port to said return port to produce a build-up of pressured fluid in said inlet port, and resilient means urging said valve seat toward said shuttle valve, said resilient means being proportioned to exert an initial biasing force on said valve seat substantially less than the effective maximum pressure force developed on said shuttle valve when in closed position, whereby the rate of initial pressure build-up in the system by shifting of said shuttle valve to closed position is substantially reduced by displacement of said valve seat against the bias of said resilient means.

2. A pressure build-up control valve comprising a housing defining a valve bore, inlet and return axially spaced ports communicating with said bore, a first fluid pressure responsive valve part slidably mounted in said bore for limited movement relative thereto, said first valve part defining a valve seat surface disposed intermediate said inlet and return ports throughout the range of limited axial movement of said first valve part, a second fluid pressure responsive valve part axially slidably mounted in said bore and having a valve surface constructed and arranged to cooperate with said valve seat surface to interrupt fluid flow from said inlet port to said return port, control means movable to a position admitting fluid from said inlet port to said second valve part to move said second valve part into engagement with said first valve part to produce a pressure build-up in said inlet port, and a spring urging said first valve part toward said second valve part, said spring being proportioned to exert an initial biasing force on said first valve part substantially less than the maximum effective force exerted on said first valve part by the fluid pressure developed by interruption of fluid flow between said inlet and return ports, whereby the rate of build-up of fluid pressure resulting from shifting said second valve part to closing portion relative to said first valve part is substantially limited until said first valve part is pressure shifted to its limited position against the bias of said spring.

3. A pressure actuated shuttle valve comprising a housing defining a valve bore, inlet, return and control axially spaced ports communicating with said bore, a first fluid pressure responsive valve part slidably mounted in said bore for limited movement relative thereto, said first valve part defining a valve seat surface disposed intermediate said inlet and return ports throughout the range of limited axial movement of said first valve part, a second valve part axially slidably mounted in said bore and having a valve surface constructed and arranged to cooperate with said valve seat surface to interrupt fluid flow from said inlet port to said return port, a piston portion on said second valve part disposed intermediate said control port and said other ports to receive pressured fluid from said inlet port to move said second valve part into seating engagement with said first valve part, and a spring urging said first valve part toward said second valve part, said spring being proportioned to exert an initial biasing force on said first valve part substantially less than the maximum effective force exerted on said first valve part by the fluid pressure developed by interruption of fluid flow between said inlet and return ports, whereby the rate of build-up of fluid pressure resulting from shifting said second valve part to closing position relative to said first valve part is substantially limited until said first valve part is pressure shifted to its limited position against the bias of said spring.

4. In a tractor hydraulic system, a valve housing having a valve bore formed therein and having inlet, return and control ports communicating with said valve bore, a fluid pressure responsive valve member slidably mounted in said valve bore and having a fluid connection therein joining said inlet and return ports, a fluid pressure responsive shuttle valve slidably mounted in said valve bore in alignment with said valve member and having a part adapted to cooperate with said valve member to close said fluid connection therein, a control valve in said valve housing selectively establishing communication between said inlet port and said valve bore on the side of said shuttle valve remote from said valve member to urge said shuttle valve toward said valve member to cut off said connection therein and interrupt the flow of fluid from said inlet port to said return port to effect a build-up of pressured fluid in said control port, a coil spring in said valve bore acting upon said valve member to urge the latter toward said shuttle valve, and stop means in said valve bore permitting a limited movement of said valve member against the bias of said spring when said shuttle valve is actuated by fluid pressure from said inlet port through said control valve to permit a limited movement of said valve member and shuttle valve to reduce the initial pressure build-up in the control port.

References Cited in the file of this patent

UNITED STATES PATENTS

| | | |
|---|---|---|
| 1,585,529 | Boving | May 18, 1926 |
| 1,960,996 | Guernsey | May 29, 1934 |
| 2,607,599 | Kanuch | Aug. 19, 1952 |
| 2,662,618 | Troyer | Dec. 15, 1953 |

FOREIGN PATENTS

| | | |
|---|---|---|
| 563,862 | Great Britain | Sept. 1, 1944 |